United States Patent
Harada et al.

(10) Patent No.: US 9,624,820 B2
(45) Date of Patent: Apr. 18, 2017

(54) CONTROL DEVICE FOR DIRECT INJECTION GASOLINE ENGINES

(71) Applicant: Mazda Motor Corporation, Aki-gun, Hiroshima (JP)

(72) Inventors: Yuji Harada, Higashihiroshima (JP); Tatsuya Tanaka, Higashihiroshima (JP); Masatoshi Seto, Hatsukaichi (JP); Hiroyuki Yamashita, Hiroshima (JP); Tsugio Fukube, Higashihiroshima (JP)

(73) Assignee: Mazda Motor Corporation, Hiroshima (JP)

( * ) Notice: Subject to any disclaimer, the term of this patent is extended or adjusted under 35 U.S.C. 154(b) by 143 days.

(21) Appl. No.: 14/547,058

(22) Filed: Nov. 18, 2014

(65) Prior Publication Data

US 2015/0144093 A1     May 28, 2015

(30) Foreign Application Priority Data

Nov. 25, 2013   (JP) .................................. 2013-242597

(51) Int. Cl.
*F02B 3/00*     (2006.01)
*F02B 17/00*    (2006.01)
(Continued)

(52) U.S. Cl.
CPC .......... *F02B 17/005* (2013.01); *F02D 41/402* (2013.01); *F02F 3/12* (2013.01);
(Continued)

(58) Field of Classification Search
CPC ...... F02B 17/005; F02B 77/11; F02D 41/402; F02D 41/182; F02D 41/0002;
(Continued)

(56) References Cited

U.S. PATENT DOCUMENTS

| 5,479,902 A * | 1/1996 | Wirbeleit ............ F02D 41/3827 |
| | | 123/472 |
| 5,593,095 A * | 1/1997 | Davis ..................... F02M 61/18 |
| | | 239/533.12 |

(Continued)

FOREIGN PATENT DOCUMENTS

| JP | 09217627 A | 8/1997 |
| JP | 2009243355 A | 10/2009 |
| WO | WO2010/004838 A1 * | 1/2010 ............ F02B 23/101 |

*Primary Examiner* — Hung Q Nguyen
(74) *Attorney, Agent, or Firm* — Alleman Hall McCoy Russell & Tuttle LLP

(57) ABSTRACT

A control device for direct injection gasoline engines includes a fuel injection control part (engine control device) composed to control a fuel injection aspect of an injector. The fuel injection control part changes an injection mode of the injector by changing the lift amount of the injector and the injection interval of the fuel respectively. The fuel injection control part switches between a first injection mode, which includes multiple times of the fuel injection with the small lift amount of the injector and the small interval of the fuel injection, and a second injection mode, which includes multiple times of the fuel injection with the bigger lift amount of the injector and the larger interval of the fuel injection than those of the first injection mode, according to an operating state of the engine body.

19 Claims, 8 Drawing Sheets

(51) Int. Cl.
  *F02F 3/28* (2006.01)
  *F02F 3/12* (2006.01)
  *F02D 41/40* (2006.01)
  *F02D 41/38* (2006.01)
  *F02B 77/11* (2006.01)
  *F02D 41/18* (2006.01)
  *F02P 9/00* (2006.01)
  *F02D 41/00* (2006.01)

(52) U.S. Cl.
  CPC ............... *F02F 3/28* (2013.01); *F02B 77/11* (2013.01); *F02D 41/0002* (2013.01); *F02D 41/182* (2013.01); *F02D 2041/001* (2013.01); *F02D 2041/389* (2013.01); *F02D 2200/501* (2013.01); *F02D 2200/602* (2013.01); *F02P 9/007* (2013.01); *F05C 2251/048* (2013.01); *Y02T 10/44* (2013.01)

(58) Field of Classification Search
  CPC ......... F02D 2200/501; F02D 2200/602; F02D 2041/001; F02D 2041/389; F02F 3/12; F02F 3/28; Y02T 10/44; F02P 9/007; F05C 2251/048
  See application file for complete search history.

(56) References Cited

U.S. PATENT DOCUMENTS

| | | | | |
|---|---|---|---|---|
| 6,032,637 A * | 3/2000 | Mamiya | ............... | F02D 35/00 123/295 |
| 6,155,499 A * | 12/2000 | Rembold | ............... | B23H 9/00 239/453 |
| 6,364,221 B1 * | 4/2002 | Czimmek | ............ | F02M 51/0603 239/5 |
| 6,629,519 B1 * | 10/2003 | Bertsch | ............... | F02M 45/02 123/305 |
| 6,748,872 B2 * | 6/2004 | Parrish | ............... | F02B 61/045 123/305 |
| 2003/0066509 A1 * | 4/2003 | Shafer | ............... | F02D 41/3035 123/305 |
| 2012/0000197 A1 * | 1/2012 | Maruyama | .......... | F02D 41/0057 60/605.2 |

* cited by examiner

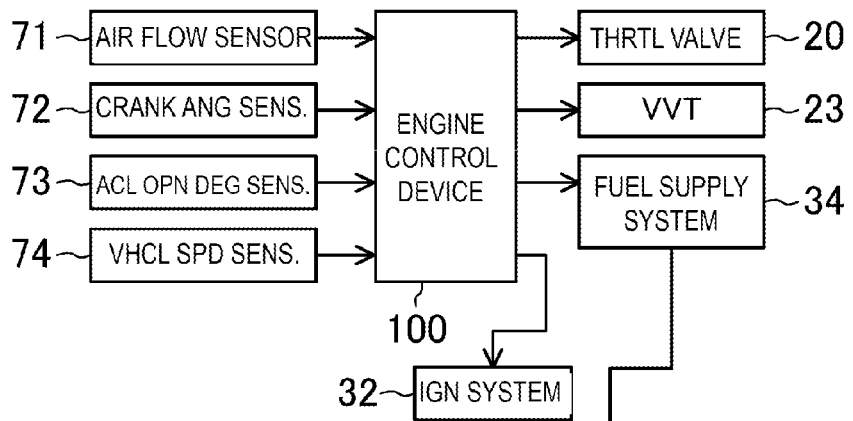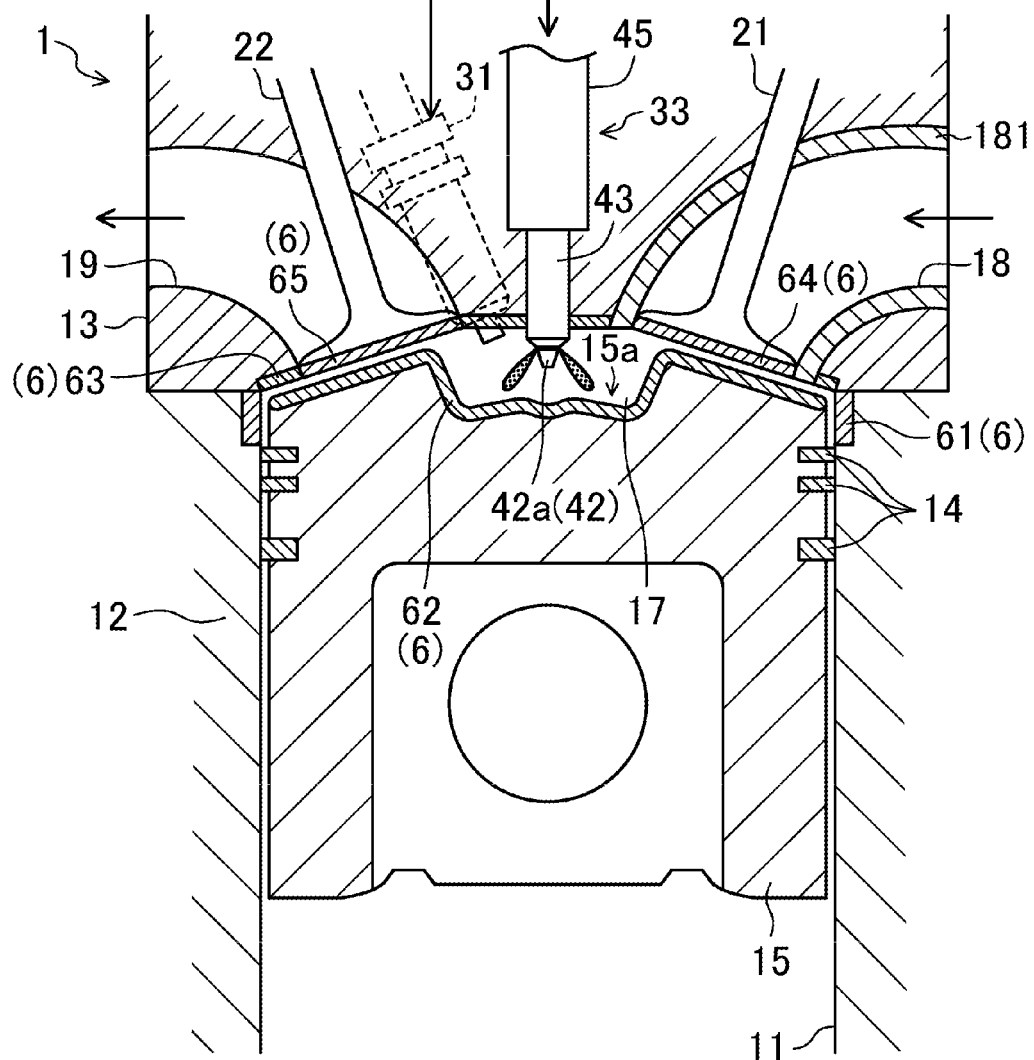

FUEL-AIR MIXTURE LAYER

RADIAL DIRECTION

AXIAL DIRECTION

LIFT AMOUNT SMALL

NEGATIVE PRESSURE AREA

LIFT AMOUNT LARGE

NEGATIVE PRESSURE AREA

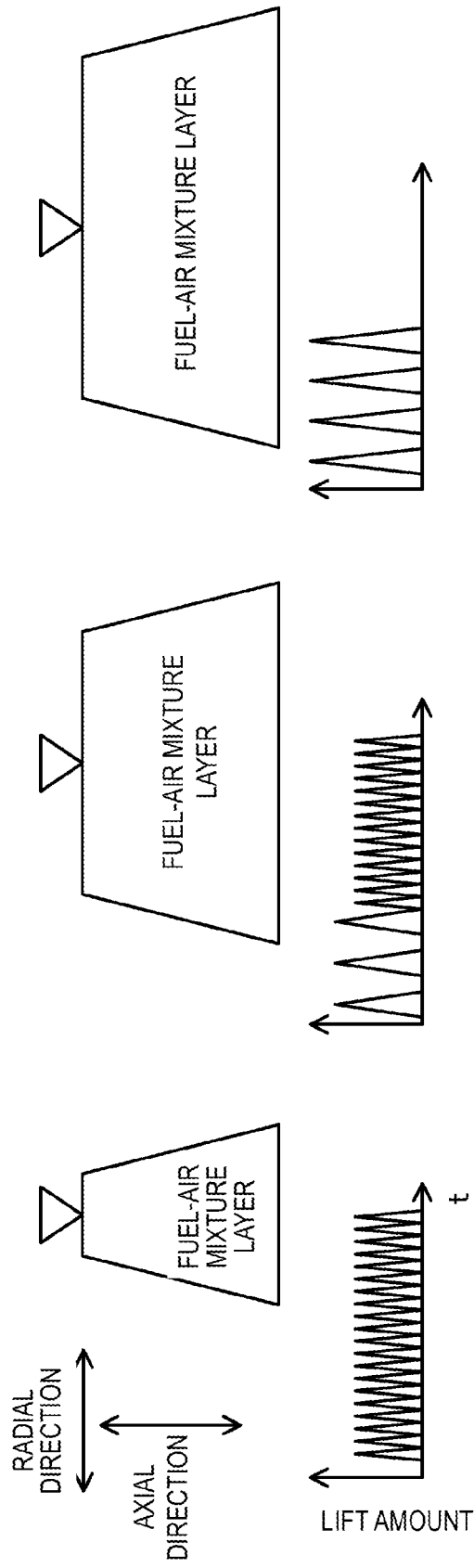

CONTROL DEVICE FOR DIRECT INJECTION GASOLINE ENGINES

FIELD OF THE INVENTION

The presently disclosed technology relates to a control device for direct injection gasoline engines.

BACKGROUND ART

For example, Patent Document 1 describes an engine, in which an inside of a combustion chamber is divided into a central combustion chamber and a main combustion chamber by a cavity recessed on a lower surface of a cylinder head and a protrusion part provided with a convexity on a piston crown surface in order to improve a theoretical thermal efficiency of a spark ignition type gasoline engine, and with a compression ratio of the entire combustion chamber set high to the extent of 16 degrees, an air-fuel mixture is set relatively rich inside the central combustion chamber and set relatively lean inside the main combustion chamber so that the combustion chamber of the engine has a lean air-fuel mixture on the whole.

Moreover, for example, Patent Document 2 discloses a technology in which a surface which divides and forms the combustion chambers of an engine is composed of heat insulating materials, including a large number of bubbles, from the point of view of improving the thermal efficiency by reducing the cooling loss. The compression ratio of the engine is 16 in Patent Document 2.

RELATED ART

Patent Document

Patent Document 1
Japanese Unexamined Patent Application Publication No. HEI 9-217627
Patent Document 2
Japanese Unexamined Patent Application Publication No. 2009-243355

SUMMARY OF THE INVENTION

Problems to be Solved by the Invention

In order to reduce cooling loss, as in the engine described in the Patent Document 2, in addition to, or instead of, insulating a wall surface of the combustion chamber, along with the formation of an air-fuel mixture layer in a central part inside of the combustion chamber, a heat insulation gas layer (for example, a gas layer including fresh air and exhaust gas) may be formed at the periphery of the air-fuel mixture layer. Therefore, while restraining the combustion flame from contact with the wall surfaces of the combustion chamber with the heat insulation gas layer intervening between the air-fuel mixture layer and the wall surface of the combustion chamber, the cooling loss is reduced by the function of the insulation gas layer itself, as the insulation layer intervenes between a combustion flame and the wall surfaces of the combustion chamber.

However, even though the air-fuel mixture layer can be contained in the central part of the combustion chamber when the fuel injection amount is relatively low, as the fuel injection amount increases, the fuel spray may be spread widely in the direction of the fuel injection and the air-fuel mixture layer may touch the wall surface of the combustion chamber. Therefore, forming the heat insulation gas layer at the periphery of the air-fuel mixture layer becomes difficult. In particular, since an engine, like the engine cited in the Patent Document 2, which is provided with a high geometrical compression ratio, has a small capacity in the combustion chamber when a piston is positioned at a top dead center, the air-fuel mixture layer in such an engine may especially easily contact the wall surface of the combustion chamber. To be certain that the heat insulation gas layer forms inside of the combustion chamber, a new fuel injection technology is needed that can control the shape of the air-fuel mixture layer to be formed inside the combustion chamber by adjusting the expansion of the fuel spray.

Since such technology which controls the shape of the air-fuel mixture layer inside of the combustion chamber enables spatial control of the distribution of the air fuel ratio inside of the combustion chamber, it is possible to use such technology not only for the purpose of forming the heat insulation gas layer mentioned above, but also for various other purposes.

In view of these problems, the purpose of the technology disclosed herein is to control the shape of the air-fuel mixture layer formed inside of the combustion chamber.

BRIEF SUMMARY OF THE INVENTION

The inventors of the present invention have found that adjusting two parameters, which are the various sizes of momentum of the fuel spray to be injected into the combustion chamber and the size of the negative pressure area formed in the combustion chamber according to high speed flows of the fuel spray, by changing the particle size of the fuel spray and the fuel injection interval, respectively, makes it possible to change the expansion of the fuel injection inside of the combustion chamber in two independent directions, which are in the direction of the fuel injection shaft (this direction is equivalent to the direction of the central axis of an injector) and in a radial direction with the fuel injection shaft as a center, thereby arriving at the technology disclosed herein.

Specifically, the disclosed technology herein relates to a control device for a direct injection gasoline engine, comprising: an engine body having a cylinder; an injector for injecting fuel including at least gasoline into the cylinder and being configured so that the larger a lift amount of the injector is, the larger a fuel injection opening area of the injector becomes; and a fuel injection control part for restraining a fuel injection aspect of the injector. The fuel injection control part changes injection modes of the injector by changing each of the lift amount of the injector and an injection interval of the fuel, and switches between a first injection mode, which includes multiple fuel injections at a number of times that are spaced by a small fuel injection interval and with a small lift amount of the injector, and a second injection mode, which includes multiple fuel injections at a number of times that are spaced by a larger fuel injection interval and with a larger lift amount of the injector than those of the first injection mode, according to an operating state of the engine.

The opening area of the injector for the fuel injection becomes larger as the lift amount becomes larger, so that the particle size of the fuel injection becomes larger. This means that the momentum of the fuel injection to be injected into the combustion chamber becomes larger. On the other hand, the opening area of the fuel injection becomes smaller as the lift amount of the injector becomes smaller, so that the particle size of the fuel spray becomes smaller. This means that the momentum of fuel spray to be injected into the combustion chamber becomes smaller.

Moreover, an area, which becomes a negative pressure area according to the Coanda effect, occurs near the central axis of the fuel injection together with the fuel injection into the combustion chamber. When the fuel injection interval is small, the negative pressure area expands in the direction of the central axis while maintaining the negative pressure due to the successive fuel injections. In contrast, when the fuel injection interval is large, the pressure of the negative pressure area can be recovered before the next fuel injection, and therefore the negative pressure area becomes relatively small without expanding in the direction of the central axis.

Accordingly, the particle size of the fuel spray to be injected into the combustion chamber and the size of the negative pressure area inside the combustion chamber can be changed by changing the lift amount of the injector and the fuel injection interval respectively.

In the first injection mode including the multiple fuel injections with the relatively small lift amount of the injector and the relatively small fuel injection interval, as mentioned above, the negative pressure area extends in the central axis direction of the fuel injection and the fuel spray flows in the central axis direction because it is pulled by the negative pressure due to the small particle size and the small momentum of the fuel spray. Consequently, while the fuel spray is restrained from expanding outward in the radial direction crossing the central axis of the fuel injection, the expansion in the central axis direction is promoted. In this way, in the first injection mode, an air-fuel mixture layer with a vertically long shape, so to speak, is formed, which expands along the central axis of the fuel injection rather than expanding outward in the radial direction.

Meanwhile, in the second injection mode including the multiple fuel injections with the relatively large lift amount of the injector and the relatively large fuel injection interval, as mentioned above, the negative pressure area becomes small and the fuel spray expands outward in the radial direction without being pulled by the negative pressure of the central axis side due to the large particle size and the large momentum of the fuel spray. Consequently, while the fuel spray is restrained from expanding in the central axis direction of the fuel injection, the outward expansion in the radial direction of the central axis direction is promoted. In this way, in the second injection mode, the air-fuel mixture layer with a so-called horizontally long shape is formed, which expands outward in the radial direction rather than expanding along the central axis of the fuel injection.

Therefore, since the first injection mode and the second injection mode can form different shapes of the air-fuel mixture layer inside the combustion chamber, the formation of the air-fuel mixture layer inside the combustion chamber can be optimized by switching between the first injection mode and the second injection mode according to the operating state of the engine.

According to the operating state of the engine body, the fuel injection control part may be further configured to perform a fuel injection in a third injection mode in which the number of times of the fuel injection is reduced as compared to the first injection mode, and in which at least one fuel injection having a larger lift amount than that of the first injection mode is performed.

By performing the fuel injection having the larger lift amount than that of the first injection mode, the particle size of the fuel injection becomes relatively large, thus it is hard to pull the fuel spray to the negative pressure area, so the fuel spray easily expands outward in the radial direction. By adding a fuel injection that has a lift amount relatively large in comparison to the fuel injection by the first injection mode, the air-fuel mixture layer that is formed expands more outwardly in the radial direction compared with when in the first injection mode. Moreover, by increasing the number of fuel injections with the large lift amount, the air-fuel mixture layer that is formed expands even further outward in the radial direction. Therefore, the shape of the air-fuel mixture layer can be precisely and minutely controlled. Moreover, by adjusting the lift amount to be added and/or the number of the fuel injections to be added to first injection mode, together with restraining injection by the first injection mode, for example, by performing a fuel injection with a larger injection interval than that of the first injection mode and reducing the number of the injections by the first injection mode, the shape of the air-fuel mixture layer can be more minutely controlled.

The fuel injection control part may add at least one fuel injection that has a larger injection interval than that of the first injection mode for the fuel injection by the first injection mode according to the operating state of the engine body.

By performing the fuel injection having the larger injection interval than that of the first injection mode, the negative pressure area becomes relatively small. Because it is hard to pull the fuel spray to the negative pressure area, the fuel spray easily expands outward in the radial direction. By adding the fuel injection that has the relatively large injection interval for the fuel injection by the first injection mode, the air-fuel mixture layer that is formed expands further outward in the radial direction than when in the first injection mode. Moreover, by increasing the number of added fuel injections that have a large lift amount, the air-fuel mixture layer to be that is formed expands further outward in the radial direction. In this way, by adjusting the injection interval of the fuel injection to be added and/or the number of the fuel injections to be added to the first injection mode, the shape of the air-fuel mixture layer can be more precisely and minutely controlled.

In addition, the fuel injection control part may add at least one fuel injection that has a larger lift amount and a larger injection interval than the fuel injections of the first injection mode, according to the operating state of the engine body. In other words, the fuel injection control part may add a fuel injection of the type performed in the second injection mode to the fuel injection of the first injection mode. This modified fuel injection may be referred to as a third injection mode. Also in this case, the air-fuel mixture layer that is formed expands further outward in the radial direction than when in the first injection mode.

The fuel injection control part may inject fuel into the cylinder for the injector during the period from a later stage of a compression stroke to an early stage of an expansion stroke, so that an air-fuel mixture layer is formed in a central part inside the combustion chamber and a heat insulation gas layer is formed at the periphery of the air-fuel mixture layer, and wherein the fuel injection control part sets the second injection mode when the fuel injection amount exceeds a second predetermined quantity that is more than a first predetermined quantity, and the fuel injection control part sets the first injection mode when the fuel injection amount is not more than the first predetermined quantity.

By injecting the fuel inside the cylinder (that is, the combustion chamber), near the top dead center of compression of the period between the later stage of the compression stroke and the early stage of the expansion stroke, the heat insulation gas layer can be formed at the periphery of the and air-fuel mixture layer and the air-fuel mixture layer can be formed in the central part inside the combustion chamber. In this way, by making a ratio (S/V ratio) of a surface area (S) to a volume (V) of the air-fuel mixture layer small, while a heat transfer area with the periphery gas layer becomes small when the air-fuel mixture is burnt, the heat insulation gas layer at the periphery of the air-fuel mixture layer restrains the combustion flame from contact with the wall surface of the combustion chamber and functions as the heat insulation layer intervening between the combustion flame and the wall surface of the combustion chamber; therefore, it becomes advantageous to the reduction of cooling loss, and by extension, the improvement in thermal efficiency.

The fuel injection control part sets the first injection mode when the fuel injection amount is no more than the first predetermined quantity. In this way, the air-fuel mixture layer to be formed inside the combustion chamber becomes a vertically long shape along the central axis of the fuel injection and the heat insulation gas layer at the periphery can be formed with certainty. On the other hand, when the fuel injection amount exceeds the second predetermined quantity, in other words, when the fuel injection amount is relatively large, the second injection mode is set. In this way, the air-fuel mixture layer formed inside the combustion chamber becomes a horizontally long shape expanding in a radial direction relative to the central axis of the fuel injection and the heat insulation gas layer at the periphery can be formed with certainty.

Therefore, regardless of the size of the fuel injection amount, a reduction of cooling loss and an improvement in thermal efficiency may be provided by forming the heat insulation gas layer inside the combustion chamber with certainty.

While the fuel injection control part may form the fuel-air mixture layer and the heat insulation gas layer inside the combustion chamber when the operating state of the engine is in a predetermined of low load range or middle load range, the fuel injection control part sets the first injection mode when the operating state of the engine is in the low load range, and sets the second injection mode when the operating state of the engine is in the middle load range.

When the operating state of the engine body is in the area of the low load and the fuel injection amount is relatively small, the first injection mode may be set, and when the operating state of the engine body is in the area of the middle load and the fuel injection amount is relatively large, the second injection mode may be set. By doing so, when the fuel injection amount is not so large because the engine load is lower than a high load, the air-fuel mixture layer and the heat insulation gas layer can be formed; therefore, the reduction of cooling loss may be provided.

The injector may be an outward opening valve type, which injects the fuel spray in a hollow cone shape, and it may be located on the central axis of the cylinder on the ceiling surface of the combustion chamber, and a concavity may be formed on the crown surface of the piston opposed to the injector.

In this configuration, the central axis of the combustion chamber (that is, the central axis of the injector) matches with the direction of the central axis of the cylinder and the injector will inject the fuel from the ceiling surface of the combustion chamber to the piston crown surface Therefore, in the first injection mode, by forming the air-fuel mixture layer, which expands in the central axis direction of the cylinder without much outward expansion in the radial direction, the air-fuel mixture layer touches neither the inner wall of the cylinder nor the piston crown surface, on which the concavity is formed, so that the heat insulation gas layer can be formed with certainty. On the other hand, in the second injection mode, since the air-fuel mixture layer expands outward in the radial direction, it touches neither the piston crown surface, on which the concavity is formed, nor the inner wall of the cylinder, so that the heat insulation gas layer can be formed with certainty.

More preferably, as mentioned above, when the fuel injection amount is relatively small, the first injection mode is set, and when the fuel injection amount is relatively large, the second injection mode is set. In other words, when the fuel injection amount is relatively small, the air-fuel mixture layer may be easily formed in the central part of the combustion chamber, and when the fuel injection amount is relatively large, the air-fuel mixture layer expands especially in the direction along the central axis of the cylinder and tends to touch the piston crown surface. Thereupon, when the fuel injection amount is relatively large, by setting the second injection mode, the expansion of the air fuel mixture in the direction along the central axis of the cylinder is restrained, while the outward expansion of the air-fuel mixture layer in the radial direction is promoted. Therefore, by avoiding having the air-fuel mixture layer touch the piston crown surface, it becomes possible to avoid having it touch the inner wall of the cylinder. That is, when the fuel injection amount is relatively large, the heat insulation gas layer can be formed with certainty.

The geometrical compression ratio of the engine body may be more than 15.

By setting the geometrical compression ratio of the engine body comparatively high, the thermal efficiency is increased and it advantageously contributes to an improvement in fuel consumption. On the other hand, when the geometrical compression ratio is comparatively high, the shape of the combustion chamber may become small and it becomes difficult to form the air-fuel mixture layer in the central part inside the combustion chamber and the heat insulation gas layer at the periphery; however, as mentioned above, by switching between the first injection mode and the second injection mode, regardless of the size of the fuel injection amount, the air-fuel mixture layer and the heat insulation gas layer can be formed inside the combustion chamber with certainty. As a result, the cooling loss is reduced and a further improvement in thermal efficiency may be provided.

Effects of the Invention

By using an injector composed so that the larger lift amount is, the larger the opening area of the fuel injector becomes according to the control device for direct injection gasoline engines as described above, control of the shape of the air-fuel mixture layer formed inside the combustion chamber can be achieved by switching between the first injection mode and the second injection mode, wherein the first injection mode includes multiple fuel injections with a relatively small lift amount of the injector and a relatively small fuel injection interval, and the second injection mode includes multiple fuel injections with a relatively large lift amount of the injector and a relatively large fuel injection interval.

BRIEF DESCRIPTION OF THE DRAWINGS

FIG. 1 is a schematic illustration showing a direct injection gasoline engine.

FIGS. 10(a)-(c) are diagrams illustrating the combinations of the fuel injection modes and the shapes of the air-fuel mixture layer to be formed inside the combustion chamber by these combinations.

DETAILED DESCRIPTION OF THE EMBODIMENTS

Figure 2:
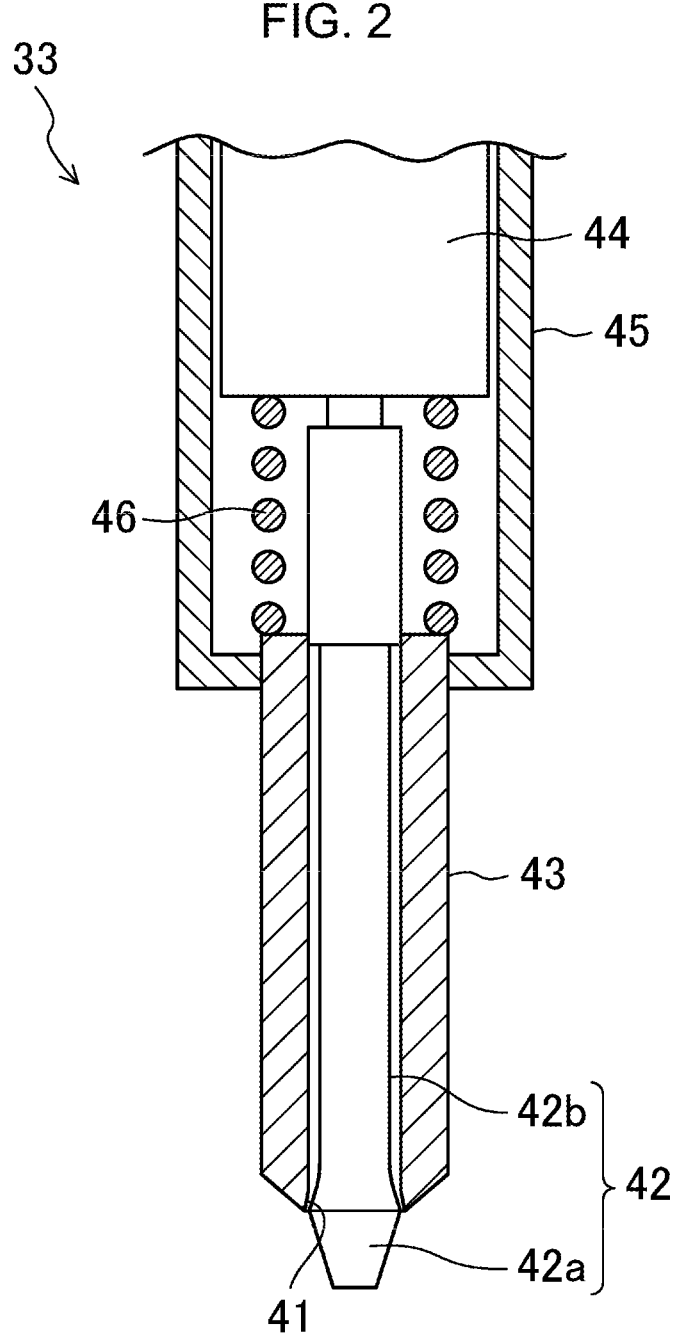
FIG. 2 is a sectional view illustrating the internal configuration of the injector.

Hereinafter, embodiments of direct injection gasoline engines are described in detail based on the figures. FIG. 1 is a schematic diagram illustrating a direct injection gasoline engine 1 (hereinafter, engine 1). The engine 1 includes various actuators accompanying the engine body, various sensors, and an engine control device 100 that controls the actuator based on signals from the sensors.

The engine 1 is mounted on a vehicle, such as an automobile, and an output shaft, not shown in figures, is connected with the driving wheels through a transmission. The vehicle drives by transmitting the output of the engine 1 to the driving wheels. The engine body of the engine 1 includes a cylinder block 12 and a cylinder head 13 placed on it, and a plurality of cylinders 11 are formed inside of the cylinder block 12 (FIG. 1 shows only one cylinder 11). A water jacket in which the coolant flows (not shown in figures) is formed inside of the cylinder block 12 and the cylinder head 13.

A piston 15 is slidably fit and inserted into each cylinder 11 respectively. The piston 15 divides a combustion chamber 17 with the cylinder 11 and the cylinder head 13. An example figure shows that the combustion chamber 17 is a so-called pent roof type and its ceiling surface (that is the lower surface of the cylinder head 13) has a triangular roof shape that is formed from two inclined surfaces of an air intake side and an exhaust side. A crown surface of the piston 15 is formed convexly in a shape that corresponds to the ceiling surface and a cavity 15a (concavity) is formed on the central part of the crown surface. In addition, the shapes of the ceiling surface and the piston 15 may have any shapes as long as below-mentioned the high geometric compression ratio is realized. For example, both of the ceiling surface and the crown surfaces of the piston 15 (that is, a part except the cavity 15a) may be configured to have surfaces that are perpendicular relative to the central axis of the cylinder 11, or alternatively the crown surface of the piston 15 (that is, a part except the cavity 15a) may be configured to have a surface that is perpendicular relative to the central axis of the cylinder 11 while the ceiling surface has a triangular roof shape as mentioned above.

Although FIG. 1 shows only one intake port, it will be appreciated that two intake ports 18 are formed on the cylinder head 13 for each cylinder 11, each of which communicates with the combustion chamber 17 by opening to the lower surface of the cylinder head 13 (that is, the inclined surface of the air intake side on the ceiling surface of the combustion chamber 17). Similarly, two exhaust ports 19 are formed on the cylinder head 13 for each cylinder 11, and each of them communicates with the combustion chamber 17 by opening to the lower surface of the cylinder head 13 (that is, the inclined surface of the exhaust side on the ceiling surface of the combustion chamber 17). The intake port 18 is connected to the intake passage (not shown) where the fresh air that is introduced into the cylinder 11 flows. A throttle valve 20 that adjusts the intake flow amount is inserted in the intake passage, and the opening degree of the throttle valve 20 is adjusted by receiving control signals from the engine control device 100. On the other hand, the exhaust port 19 is connected to the exhaust passage (not shown) where the combusted gas (that is, the exhaust gas) from each cylinder 11 flows. An exhaust gas cleaning system, not shown in figures, which may have than one catalytic converter is located to the exhaust passage. Each catalytic converter may include a three-way catalyst.

An intake valve 21 and an exhaust valve 22 are arranged in the cylinder head 13 so that they can block (close) the intake port 18 and the exhaust port 19 from the combustion chamber 17, respectively. The intake valve 21 and the exhaust valve 22 are driven by an intake valve drive mechanism and an exhaust valve drive mechanism, respectively. The intake valve 21 and the exhaust valve 22 reciprocate at a predetermined timing and exchange the gas inside the cylinder 11 by opening and shutting the intake port 18 and the exhaust port 19, respectively. The intake valve drive mechanism and the exhaust valve drive mechanism, not shown in figures, have an intake camshaft and an exhaust camshaft that are respectively drivingly connected to a crankshaft of the engine, and these camshafts rotate synchronously with the rotation of the crankshaft. Moreover, at least the intake valve drive mechanism includes a hydraulic type, electric type, or mechanical type of a phase variable mechanism (Variable Valve Timing: VVT) 23 that can continuously change the phase of the intake camshaft within a predetermined degree range. Further, a lift variable mechanism (CVVL (Continuous Variable Valve Lift)), which can continuously change the valve lift amount, may be included with the VVT 23.

In addition, a spark plug 31 is arranged in the cylinder head 13. This spark plug 31 is fixedly mounted to the cylinder head 13 with a well-known structure such as a threaded fastening structure. The spark plug 31, in the example figure, is fixedly mounted in a tilted orientation to the exhaust side against the central axis of the cylinder 11 and its tip part faces the ceiling part of the combustion chamber 17. The tip part of the spark plug 31 is located in the vicinity of a nozzle opening 41 of a below-mentioned injector 33. Further, the arrangement of the spark plug 31 is not limited to this arrangement. In the present embodiment, the spark plug 31 is a plasma ignition type plug, and an ignition system 32 includes a plasma generation circuit. Moreover, the spark plug 31 generates plasma by discharging electricity under control of the ignition system 32, and the fuel is ignited by injecting the plasma in a jet form from the tip of the spark plug 31 into the cylinder. The ignition system 32 receives the control signals from the engine control device 100 and turns on electricity so that the spark plug 31 will generates the plasma at the intended ignition timing. In addition, the spark plug 31 is not limited to a plasma ignition type plug but it may be a spark ignition type plug, which is often used.

An injector 33 that injects the fuel directly into the cylinder (that is, inside the combustion chamber 17) is arranged on the central axis of the cylinder 11 of the cylinder head 13. This injector 33 is fixedly mounted to the cylinder head 13 by using a well-known structure such as a bracket. A tip of the injector 33 is faced to the center of the ceiling part of the combustion chamber 17.

As shown in FIG. 2, the injector 33 is an outward opening valve type injector including an outward opening valve 42 that opens and shuts a nozzle opening 41 (an opening of the fuel injection) to inject the fuel into the cylinder 11. The nozzle opening 41 is formed in a tapered shape, which has a diameter that becomes larger toward a tip side, at the tip part of a fuel pipe 43 expanding along the central axis of the cylinder 11. An end part of a base end side of the fuel pipe 43 is connected to a case 45 in which a piezoelectric element 44 is arranged. The outward opening valve 42 includes a valve body 42a and a coupling part 42b that is connected from the valve body 42a through inside the fuel pipe 43 to the piezoelectric element 44. A part of the coupling part 42b side of the valve body 42a has about the same shape as the nozzle opening 41, and when the part contacts with the nozzle opening 41 (that is, is seated upon the nozzle opening), the nozzle opening 41 is in a closed state. At this time, the part of the tip side of the valve body 42a protrudes outward of the fuel pipe 43.

By pressing the outward opening valve 42 to the combustion chamber 17 side in the axial direction of the cylinder 11 by a transformation caused by the application of a voltage, the piezoelectric element 44 opens the nozzle opening 41 by lifting the outward opening valve 42 from the closed state of the nozzle opening 41. At this time, the fuel is injected from the nozzle opening 41 into the cylinder with a cone shape (in detail, hollow cone shape) centered on the central axis of the cylinder 11. The taper angle of the cone in the present embodiment is from 90° to 100° (The taper angle of the hollow part inside of the hollow cone is about 70°.) Moreover, when stopping the application of the voltage to the piezoelectric element 44, the outward opening valve 42 makes the nozzle opening 41 the closed state again by restoring the piezoelectric element 44 to its former state. At this time, a compression coil spring 46 that is arranged at the periphery of the coupling part 42b inside a case 45 is biased so as to urge the restoration (return) of the piezoelectric element 44.

Figure 7:
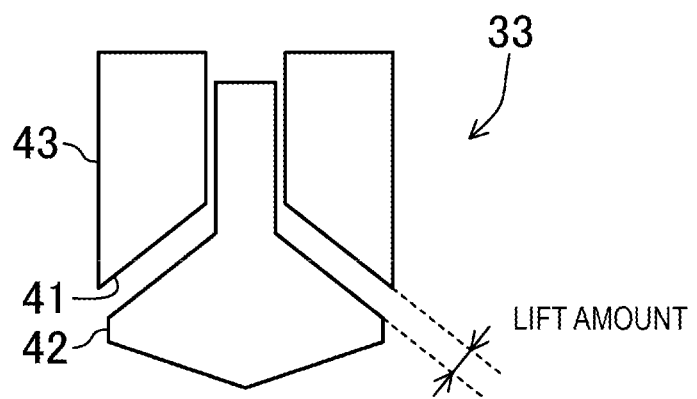
FIG. 7 is a diagram illustrating the lift amount of the injector of the outward opening valve type.

The bigger voltage the piezoelectric element 44 applies, the larger the lift amount becomes when the nozzle opening 41 is in closed state (see also FIG. 7). The larger the lift amount is, the larger the opening degree (that is, the injection opening area) of the nozzle opening 41 becomes, so that the particle size of the fuel spray to be injected into the cylinder from the nozzle opening 41 becomes large. Conversely, the smaller the lift amount is, the smaller the opening degree (that is, the injection opening area) of the nozzle opening 41 becomes, so that the particle size of the fuel spray to be injected into the cylinder from the nozzle opening 41 becomes small. The response from the piezoelectric element 44 is fast, for example, performing multi-stage injections about 20 times in one combustion cycle is possible. Therefore, the below-mentioned first injection mode and second injection mode are easily realizable.

However, the mechanism of driving the outward opening valve 42 is not limited to piezoelectric element 44.

A fuel supply system 34 includes an electric circuit for driving the outward opening valve 42 (the piezoelectric element 44) and a fuel supply line for providing the fuel to the injector 33. The engine control device 100 operates the piezoelectric element 44 and the outward opening valve 42 through the electric circuit by outputting the injection signals, which have voltages according to the lift amount, at the predetermined timing to the electric circuit, and injects the intended amount of the fuel into the cylinder. At the time of non-output of the injection signal (that is when the voltage of the injection signal is zero), the nozzle opening 41 is in the closed state of the outward opening valve 42. In this way, the operation of the piezoelectric element 44 is controlled by the injection signal from the engine control device 100. Thus, the engine control device 100 controls the operation of the piezoelectric element 44, and controls the lift amount at the time of the fuel injection and the fuel injection from the nozzle opening 41 of the injector 33.

A high pressure fuel pump or a common rail (not shown in figures) is provided in the fuel supply line, and the high pressure fuel pump force-feeds the fuel, which is provided from the fuel tank through a low pressure fuel pump, to the common rail, and the common rail accumulates the force-fed fuel at predetermined fuel pressure. By operating the injector 33 (that is, the outward opening valve 42 is lifted), the fuel accumulated in the common rail is injected from the nozzle opening 41.

Although the fuel of the engine 1 is gasoline in the present embodiment, it may be gasoline including bioethanol etc., and as long as it is a liquid fuel which contains at least gasoline, it may be any kind of fuel.

The engine control device 100 is a controller based on a well-known microcomputer and includes a central processing unit (CPU) for executing programs, memories composed by RAM or ROM, etc. for storing programs and data, and an input-output (I/O) bus for inputting and outputting electrical signals.

The engine control device 100 receives at least a signal about an intake flow amount from an air flow sensor 71, a crank angle pulse signal from a crank angle sensor 72, an accelerator opening degree signal from an accelerator opening degree sensor 73 for detecting a stepping amount of an accelerator pedal, and a vehicle speed signal from a vehicle speed sensor 74. The engine control device 100 calculates control parameters of the engine 1 based on these input signals, for example, an intended throttle opening signal, a fuel injection pulse, an ignition signal, a valve phase angle signal, etc. Moreover, the engine control device 100 outputs these signals to a throttle valve 20 (to be exact, a throttle actuator for moving the throttle valve 20), a fuel supply system 34 (to be exact, the electric circuit), an ignition system 32, and VVT 23, etc.

The geometrical compression ratio $\epsilon$ of the engine 1 is 15 or more and 40 or less. In the present embodiment, the engine 1 has a relatively high expansion ratio as well as a high compression ratio due to the relationship that the compression ratio equals the expansion ratio. The thermal efficiency is improved by making the geometric compression ratio high.

The combustion chamber 17, as shown in FIG. 1, is divided and formed by the wall surface of the cylinder 11, the crown surface of the piston 15, the lower surface (that is, the ceiling surface) of the cylinder head 13, and the surfaces of each valve head of the intake valve 21 and the exhaust valve 22. In addition, in the engine 1, the combustion chamber 17 is heat insulated by providing the heat insulation layers 61, 62, 63, 64, and 65 on these surfaces so as to reduce cooling loss. In addition, when naming generically these insulation layers 61 to 65 below, the mark "6" may be given to the insulation layers. The heat insulation layer 6 may be provided on all these section surfaces and also may be provided on a part of these section surfaces. Moreover, in an example of a figure, the heat insulation layer 61 of the cylinder wall surface is arranged at the location above a piston ring 14 while the piston 15 is located on the top dead center, so that the piston ring 14 does not slide over the heat insulation layer 61. However, the heat insulation layer 61 of the cylinder wall surface is not limited to this configuration, and it may be provided on the whole area of or a part of the stroke of the piston 15 by extending the heat insulation layer 61 downward. Moreover, the heat insulation layer may be provided on the port wall surface in the vicinity of the opening of both sides of the ceiling surface of the combustion chamber 17 for the intake port 18 or the exhaust port 19, although the wall surface is not for dividing directly the combustion chamber 17. In addition, the thickness of each of heat insulation layers 61 to 65 shown in FIG. 1 does not indicate the actual thickness and is merely an illustration, and it does not indicate the relative magnitude of the thickness of the heat insulation layer for each surface either.

The heat insulation structure of the combustion chamber 17 is described in more detail below. As mentioned above, although the heat insulation structure of the combustion chamber 17 is composed of the heat insulation layers 61 to 65, each of which is provided on a respective section surface for dividing the combustion chamber 17, these heat insulation layers 61 to 65 restrain the combustion gas inside the combustion chamber 17 from being released through each section surface, so that the thermal conductivity is set lower than that of the metal base materials composing the combustion chamber 17. At this point, the cylinder block 12 is the base material for the heat insulation layer 61 provided on the wall surface of the cylinder 11, the piston 15 is the base material for the heat insulation layer 62 provided on the crown surface of the piston 15, the cylinder head 13 is the base material for the heat insulation layer 63 provided on the ceiling surface of the cylinder head 13, and the intake valve 21 and the exhaust valve 22 are the base materials for the heat insulation layers 64 and 65 provided on each valve head of the intake valve 21 and the exhaust valve 22 respectively. Therefore, the substance of the base material for the cylinder block 12, the cylinder head 13, and the piston 15 is an aluminum alloy or a cast iron, and that for the intake valve 21 and the exhaust valve 22 is a heat resisting steel or a cast iron, etc.

Moreover, it is desirable that the heat insulation layer 6 has smaller volumetric specific heat than the base material for reducing the cooling loss. In other words, although the gas temperature inside the combustion chamber 17 is changed according to the progress of the combustion cycle, in a conventional engine that does not have a heat insulation structure of the combustion chamber 17, the coolant flows in the water jacket formed inside the cylinder head or the cylinder block, so that the temperature of the surface dividing the combustion chamber 17 is maintained almost constant regardless of the progress of the combustion cycle.

On the other hand, since the cooling loss is determined by a calculation formula: cooling loss=heat transfer coefficient×heat transfer area×(gas temperature−temperature of the section surface), the bigger the temperature differential between the gas temperature and the wall surface becomes, the bigger the cooling loss becomes. In order to restrain the cooling loss, although a small temperature differential between the gas temperature and the wall surface is desirable, it is inevitable that the temperature differential becomes large with the change of the gas temperature, when the temperature of the section surface of the combustion chamber 17 is maintained almost constant by the coolant. Accordingly, it is desirable that the temperature of the section surface of the combustion chamber 17 changes following the changes of the gas temperature inside the combustion chamber 17 by making the heat capacity of the heat insulation layer 6 small.

The heat insulation layer 6, for example, should be formed by coating a ceramic material like $ZrO_2$ by plasma spraying on the base material. Many pores may be included in this ceramic material. This process can make the thermal conductivity and the volumetric specific heat of the heat insulation layer 6 lower.

Moreover, in the present embodiment, as shown in FIG. 1, the heat insulation layer is provided on the intake port 18 by integrally cast-inserting a port liner 181 made of aluminum titanate, which has very low thermal conductivity and the excellent adiabaticity and thermostability, to the cylinder head 13. When the fresh air passes through the intake port 18, this composition can inhibit or avoid an increase in temperature by receiving heat from the cylinder head 13. In this way, since the temperature (the initial gas temperature) of the fresh air introducing into the cylinder 11 becomes low, the gas temperature in combustion becomes low, so that it becomes advantageous for reducing the temperature differential between the gas temperature and the section surface of the combustion chamber 17. Making the gas temperature in combustion become low can making the heat transfer coefficient become low, so that it becomes advantageous for reducing the cooling loss. In addition, it should be understood that the composition of the heat insulation layer to be provided in the intake port 18 is not limited to cast-inserting the port liner 181.

In this engine 1, as mentioned above, the geometrical compression ratio $\epsilon$ is set to $15 \leq \epsilon \leq 40$. The theoretical thermal efficiency $\eta_{th}$ in the Otto cycle, which is a theoretical cycle, is $\eta_{th}=1-1/(\epsilon^{\kappa-1})$, and the higher the compression ratio $\epsilon$ is set, the higher the theoretical thermal efficiency $\eta_{th}$ becomes. However, the indicated thermal efficiency of the engine (to be exact, the engine has no heat insulation structure inside the combustion chamber) reaches its peak at the prescribed geometrical compression ratio $\epsilon$ (for example, about 15). Even if the geometrical compression ratio $\epsilon$ is made higher than that, the indicated thermal efficiency will not become high, rather it will be decreased. This is attributed to the fact that when the geometrical compression ratio is made high with remaining the fuel amount and the intake amount constant, the higher the compression ratio becomes, the higher the combustion pressure and the combustion temperature become. As mentioned above, because the combustion pressure and the combustion temperature become high, the cooling loss increases.

By contrast, in this engine 1, as mentioned above, the heat insulation structure of the combustion chamber 17 is combined so that the indicated thermal efficiency becomes high at the high geometrical compression ratio $\epsilon$. In other words, the cooling loss is reduced by heat insulating the combustion chamber 17, so that the indicated thermal efficiency is increased.

On the other hand, only by heat insulating the combustion chamber 17 and reducing the cooling loss, the reduced part of the cooling loss would be converted into the exhaust loss and would not contribute to improvement of the indicated thermal efficiency as much. However, in the engine 1, as mentioned above, the energy of the combustion gas equivalent to the reduction part of the cooling loss is efficiently changed into mechanical work by making a high expansion ratio in accordance with making a high compression ratio. Therefore, by adopting a configuration that reduces the cooling loss and the exhaust loss together, the engine 1 improves the indicated thermal efficiency considerably.

The engine 1 reduces the cooling loss more by forming the heat insulation layer by the gas layer inside the cylinder (inside the combustion chamber 17) in addition to the heat insulation structure of the combustion chamber 17 and the intake port 18. Hereinafter, this is explained in detail.

Figure 3:
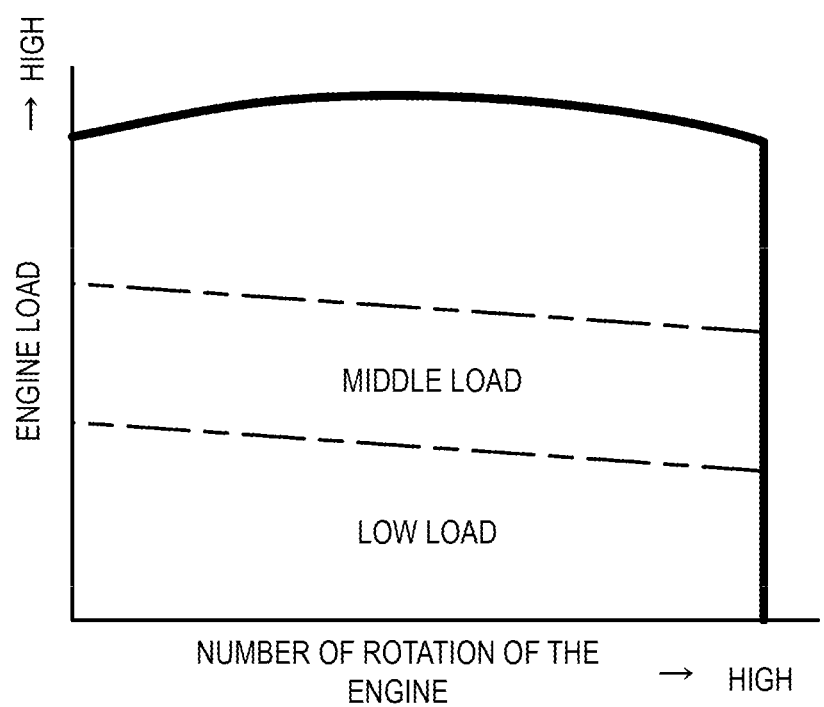
FIG. 3 is a diagram illustrating an example of the operation map of the engine.

FIG. 3 shows an example of operation maps at the warm up phase of the engine 1. The engine 1 is composed basically so that the air-fuel mixture inside the combustion chamber 17 is combusted by a compressed self-ignition over the whole area of the operating range. In the operation map shown in FIG. 3, the heat insulation layer is formed inside the combustion chamber 17 by the gas layer at the low load area having lower load than a predetermined load and the middle load area having higher load than the low load area. Therefore, by forming the heat insulation layer inside the combustion chamber 17 by the gas layer in the operating state of relatively low engine load and thereby relatively small fuel injection amount, the cooling loss is reduced and the thermal efficiency is improved. At this point, the low load area and the middle load area are equivalent to the low area and the middle area respectively when the load areas of the engine are divided into three areas of the low, middle, and high. Moreover, especially the middle load area may be an area having no more than a predetermined load equal to a fraction of the full load (for example, no more than 70% of the load), for example.

Figure 4:
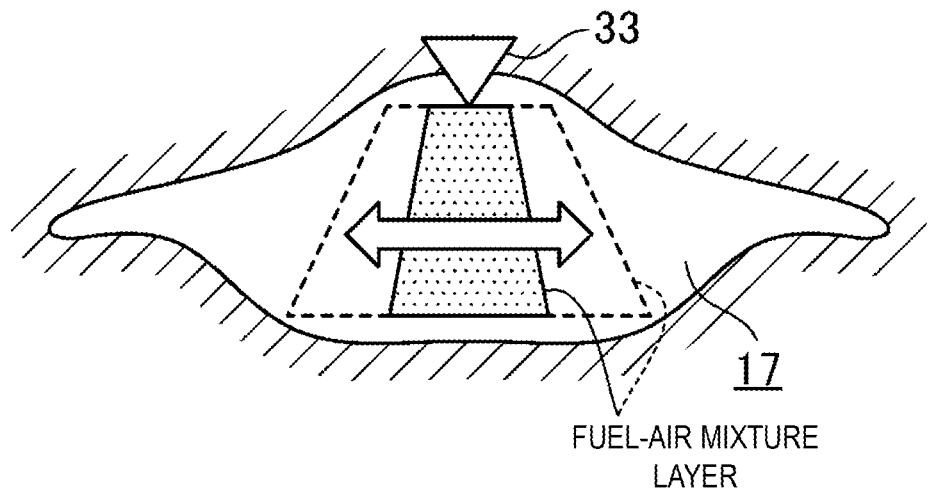
FIG. 4 is a sectional view illustrating conceptually the shape of the air-fuel mixture layer to be formed inside the combustion chamber.

FIG. 4 shows conceptually the shape of the air-fuel mixture layer that is formed inside the combustion chamber 17 at the low load and the middle load areas. As shown in the same figure, forming the heat insulation layer inside the combustion chamber 17 by the gas layer is to form the gas layer to include fresh air in its periphery as well as form the air-fuel mixture layer in the central part inside the combustion chamber 17. The gas layer may include only the fresh air or may include the combusted gas (that is EGR gas) in addition to the fresh air. Moreover, as mentioned below, it is acceptable that a small amount of the fuel is mixed in the gas layer in the limited case where the gas layer plays the role of the heat insulation layer.

While the heat transfer area of the periphery gas layer in combustion becomes small by making the ratio (S/V ratio) of the surface area (S) of the air-fuel mixture layer and the volume (V) small, the flame of the air-fuel mixture layer does not touch the wall surface of the cylinder 11 due to the gas layer between the air-fuel mixture layer and the wall surface of the cylinder 11, and the gas layer itself becomes the heat insulation layer and restrains the heat release from the wall surface of the cylinder 11. As a result, the cooling loss can be reduced considerably.

The engine control device 100 outputs the injection signal to the electric circuit of the fuel supply system 34 so as to inject the fuel into the cylinder 11 from the nozzle opening 41 of the injector 33 during the period from the later stage of the compression stroke to the early stage of the expansion stroke, so that the air-fuel mixture layer is formed in the central part inside the combustion chamber 17 and the gas layer is formed at the periphery.

Since the fuel injection amount is relatively small in the low load area, the expansion of the fuel spray is restrained by injecting the fuel into the cylinder 11 from the injector 33 provided on the central axis of the cylinder 11 during the period from the later stage of the compression stroke to the early stage of the expansion stroke, and the air-fuel mixture layer of the central part inside the combustion chamber 17 and the gas layer of its periphery can be relatively easily formed. However, since the fuel injection period becomes long according to the increases of the fuel injection amount, the fuel spray expands especially in the central axis direction of the cylinder 11. As a result, the air-fuel mixture layer, for example, will touch the crown surface of the piston 15. Therefore, the gas layer at the periphery of the air-fuel mixture layer will not be formed with certainty. As mentioned above, the engine 1 has a high geometrical compression ratio, so that the capacity of the combustion chamber (that is a space inside the cylinder when the piston is located at the top dead center) is small. Thereby, in the engine 1, the air-fuel mixture layer may easily touch the crown surface of the piston 15 when the fuel spray expands in the central axis direction of the cylinder 11.

Accordingly, the engine 1 controls the shape of the air-fuel mixture layer to be formed inside the combustion chamber 17 in order to form the air-fuel mixture layer and the gas layer at the periphery of the central part inside the combustion chamber 17 with certainty in the middle load area also where the fuel injection amount increases. Specifically, as shown by the arrows in FIG. 4, when the fuel injection amount increases, the fuel spray is expanded to outward in the radial direction crossing the central axis of the cylinder 11. Due to this, while the air-fuel mixture layer is inhibited from touching the crown surface of the piston 15 by restraining the length of the central axis direction of the air-fuel mixture layer from becoming long, the air-fuel mixture layer is also inhibited from touching the inner wall of the cylinder 11 by expanding the air-fuel mixture layer outward in the radial direction, which has more spatial allowance than the central axis direction. To control the shape of the air-fuel mixture layer to be formed inside the combustion chamber 17, the ratio (L/W) of the length L and the width W may be adjusted, the length of the central axis direction being L and the width of the radial direction being W of the air-fuel mixture layer to be formed inside the combustion chamber 17. In order to make the S/V ratio small when the fuel injection amount is increased the L/W ratio is set small together with also setting the L/W ratio bigger than a predetermined ratio.

Figure 5:
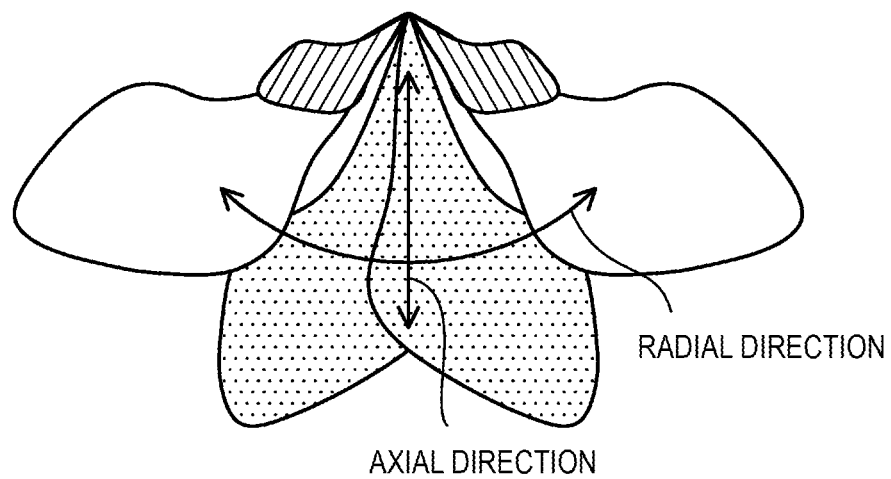
FIG. 5 is a diagram explaining the expanding directions of the fuel spray injected from the injector.
Figure 6:
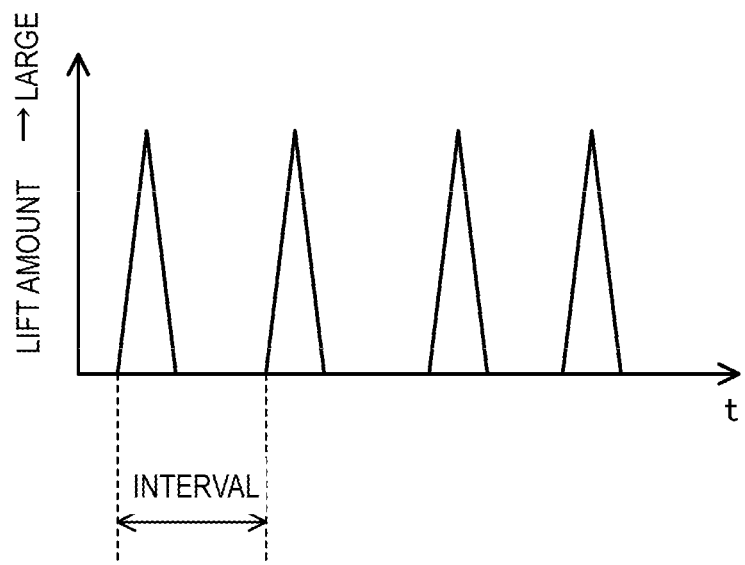
FIG. 6 is a diagram illustrating the injection interval of the fuel.

In order to implement controlling the shape of the air-fuel mixture layer, as shown in FIG. 5, restraining not only the expansion of the fuel spray in the axial direction, but also the expansion in the radial direction perpendicular to the axial direction independently from the expansion of the fuel spray to the axial direction are necessary. The engine 1 controls independently the expansion of the fuel spray for the two directions of the axial direction and the radial direction by changing the interval of the fuel injection by the injector 33 (see FIG. 6) and the lift amount (see FIG. 7) respectively. The interval of the fuel injection, as shown conceptually in FIG. 6, is defined by the interval from the beginning of the fuel injection to the beginning of the next fuel injection. As mentioned above, the injector 33 has high response, and performing multistage injections about 20 times in 1 to 2 msec are possible. Moreover, the lift amount of the injector 33, as shown conceptually in FIG. 7, is proportional to the fuel injection opening area, and as mentioned above, the bigger the lift amount becomes, the bigger the fuel injection opening area becomes, and the smaller the lift amount becomes, the smaller fuel injection opening area becomes.

Figure 8A:
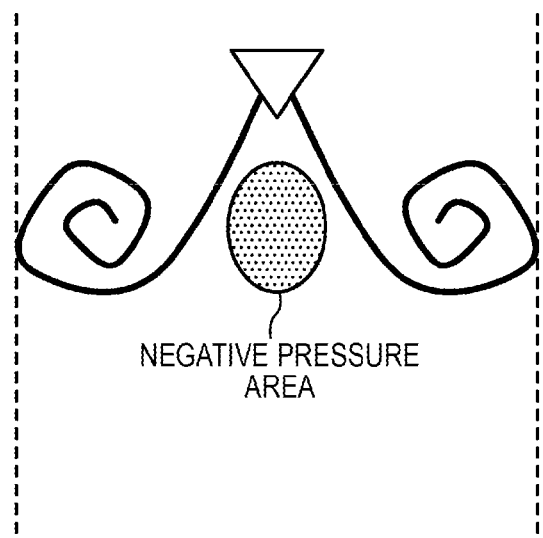
FIG. 8(a) is a schematic diagram illustrating the expansion of the fuel spray when the injection interval of the fuel is long.
Figure 8B:
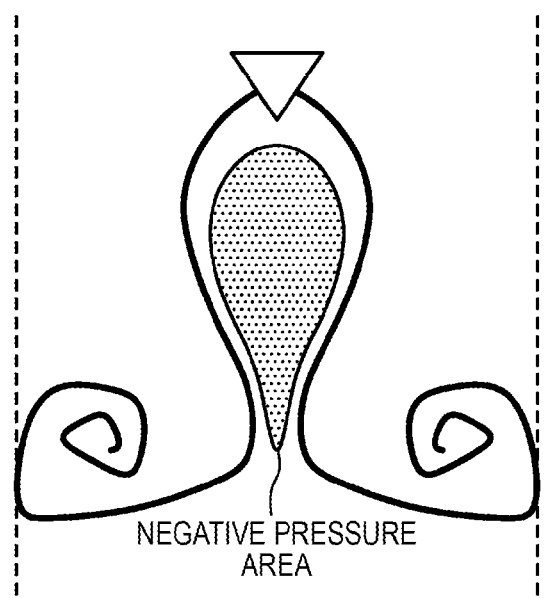
FIG. 8(b) is a schematic diagram illustrating the expansion of the fuel spray when the injection interval of the fuel is short.

FIGS. 8(*a*) and 8(*b*) shows conceptually the differences of the expansion of the fuel spray between the time when the fuel injection interval is long (FIG. 8(*a*)) and the time when the fuel injection interval is short (FIG. 8(*b*)) after the lift amount of the injector 33 keeps constant. The fuel spray injected in hollow cone shape from the injector 33 flows inside the combustion chamber 17 at high speed. Thereby, due to the Coanda effect, a negative pressure area is generated so as to be along the axis of the injector 33 inside of the hollow cone. When the fuel injection interval is long, the pressure of the negative pressure area is recovered by the time between the fuel injection and the next fuel injection, therefore the negative pressure area becomes relatively small. On the other hand, when the fuel injection interval is short, the fuel injection is repeated without great temporal spacing, therefore the pressure of the negative pressure area is restrained from being recovered. As a result, the negative pressure area, as shown in FIG. 8(*b*), expands in the axial direction.

Since this kind of negative pressure area is formed to the central side of the radial direction, the fuel spray is pulled to the negative pressure, as shown in FIG. 8(*b*); however, when the negative pressure area is relatively large, the fuel spray easily expands in the axial direction. In contrast, as shown in FIG. 8(*a*), when the negative pressure area is relatively small, the fuel spray is not pulled so much, so that expansion in the axial direction is restrained. Therefore, while it is possible to promote the expansion of the fuel spray in the axial direction if the fuel injection interval of the injector 33 is short, it is possible to restrain the expansion of the fuel spray to the axial direction, if the interval is long.

Figure 9A:
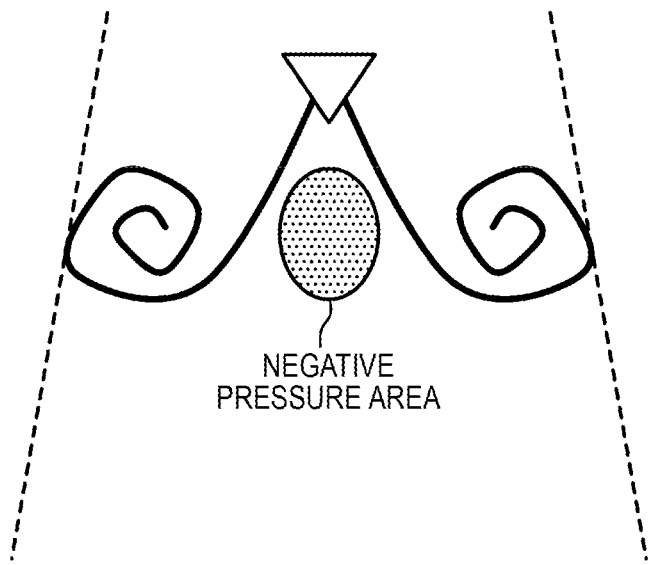
FIG. 9(a) is a schematic diagram illustrating the expansion of the fuel spray when the lift amount of the injector is small.
Figure 9B:
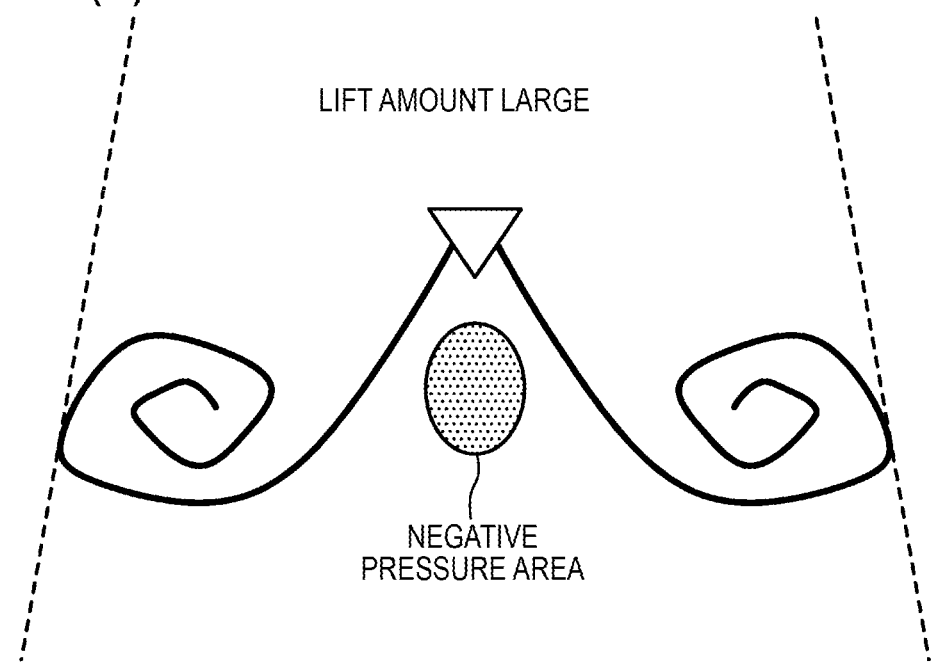
FIG. 9(b) is a schematic diagram illustrating the expansion of the fuel spray when the lift amount of the injector is large.

FIGS. 9(*a*) and 9(*b*) show conceptually the differences of the expansion of the fuel spray between the time when the lift amount of the injector 33 is small (FIG. 8(*a*)) and the time when the lift amount is large (FIG. 8(*b*)) after the fuel injection interval is kept constant. In this case, since the injection interval is same, the negative pressure area inside the combustion chamber 17 becomes the same; however, the lift amount is different, so that the particle size of the fuel spray becomes different. Therefore, when the lift amount of the injector 33 is small, the particle size of the fuel spray becomes small, so that the momentum of the fuel spray becomes small. In this manner, the fuel spray is easily pulled to the central side in the radial direction by the negative pressure, as shown in FIG. 9(*a*), so that the expansion outward in the radial direction is restrained. In contrast, when the lift amount of the injector 33 is large, the particle size of the fuel spray becomes large, so that the momentum of the fuel spray becomes large. Thereby, the fuel spray is hard to be pulled, as shown in FIG. 9(*b*), so that it is easily expand outward in the radial direction. Therefore, while it is possible to promote the expansion of the fuel spray to the radial direction if the lift amount of the injector 33 is large, it is possible to restrain the expansion of the fuel spray to the radial direction, if the lift amount is small.

In this way, it is possible to restrain independently the expansion of the fuel spray inside the combustion chamber 17 for the two directions of the axial direction and the radial direction by changing the fuel injection interval of the injector 33 and the lift amount of the injector 33. Accordingly, the engine 1 sets a first injection mode, a second injection mode, and a third injection mode that combines the first injection mode and the second injection mode, and switches the first to third injection modes according to the operating state of the engine 1, to be exact, according to the level of high or low load of the engine 1. By this, in the areas of the low load and the middle load shown in FIG. 3, the air-fuel mixture layer and the gas layer are formed with certainty and the reduction of the cooling loss is improved.

FIGS. 10(*a*) and 10(*b*) show how the fuel injection aspects of each of the first injection mode, the second injection mode, and the third injection mode, and the shapes of the air-fuel mixture layer corresponding to them. First, FIG. 10(*a*) is the first injection mode, which includes a predetermined number of times (but multiple times) of the fuel injection having the relatively small lift amount of the injector 33 and the relatively small fuel injection interval. Accordingly, as mentioned above, while the negative pressure area becomes elongated in the axial direction by making the injection interval small, the particle size of the fuel spray is made small by making the lift amount small, so that the fuel spray is restrained from expansion outward in the radial direction, while the fuel spray is pulled to the negative pressure area and expands in the axial direction. As a result, as shown the upper illustration in FIG. 10(*a*), the shape of the air-fuel mixture layer that is formed inside the combustion chamber 17 is a so-called vertically long shape, which the length of the axial direction is relatively long as compared to the radial direction.

On the other hand, FIG. 10(*c*) is the second injection mode, which includes a predetermined number of times (but multiple times) of the fuel injection having the larger lift amount of the injector 33 than that of the first injection mode and the longer fuel injection interval than that of the first injection mode. Accordingly, as mentioned above, while the negative pressure area becomes small by making the injection interval long, the particle size of the fuel spray is made large by making the lift amount large, so that the fuel spray is restrained from expansion to the axial direction, while it is hard to be pulled to the negative pressure area and expands outward in the radial direction. As a result, as shown the upper illustration in FIG. 10(*c*), the shape of the air-fuel mixture layer to be formed inside the combustion chamber 17 is a so-called horizontally long shape, which the length of the radial direction is relatively long as compared to the axial direction.

The first injection mode shown in FIG. 10(*a*) is the injection mode in the low load area, which has the relatively small fuel injection amount, in the operation map shown in FIG. 3. At this point, the length of the axial direction of the air-fuel mixture layer is set in the range that the layer does not touch the crown surface of the piston 15. In this way, the gas layer is formed with certainty at the periphery of the air-fuel mixture layer. On the other hand, the second injection mode shown in FIG. 10(*c*) is the injection mode in the middle load area, which has a relatively large fuel injection amount, in the operation map shown in FIG. 3. While the fuel injection amount is relatively large, the shape of the air-fuel mixture layer is a horizontally long shape. The L/W ratio of the air-fuel mixture layer to be formed inside the combustion chamber 17 becomes smaller compared with that in the first injection mode. Therefore, while inhibiting the air-fuel mixture layer from touching the crown surface of the piston 15 and also the inner wall of the cylinder 11, the gas layer is formed with certainty at the periphery of the air-fuel mixture layer.

FIG. 10(*b*) shows the third injection mode that combines the first injection mode and the second injection mode. In the example figure, although the fuel is injected as in the first injection mode after injecting the fuel as in the second injection mode, in a reverse way, the fuel may be injected as in the second injection mode after injecting the fuel as in the first injection mode. The expansion of the air-fuel mixture layer to especially outward in the radial direction is adjusted by combining the first injection mode and the second injection mode. As a result, the shape of the air-fuel mixture layer can be wider than that in the first injection mode and also narrower than that in the second injection mode. The number of fuel injections in the first injection mode and the number of fuel injections in the second injection mode may be set as appropriate. In the third injection mode, the number of fuel injections by the first injection mode can be reduced, while the fuel injection by the second injection mode can be added to the first injection mode. The third injection mode is an injection mode used in the load near the boundary between the low load area and the middle load area in the operation map shown in FIG. 3. Therefore, the injection mode is switched in order of the first injection mode, the second injection mode, and the third injection mode, in accordance with the changes of the fuel injection amount from small to large.

Moreover, as the third injection mode, the large lift amount of the second injection mode which is larger than in the first injection mode and the large injection interval of the second injection mode which is larger than in the first injection mode may be combined with the first injection mode. Alternatively, as the third injection mode, the fuel injection having the large lift amount as in the second mode may be combined with the first injection mode (the fuel injection interval being the same as the first injection mode), for example. In this case, the number of fuel injections by the first injection mode is also reduced. In this way also, the fuel spray having a relatively large particle size is injected by injecting the fuel having the relatively large lift amount, so that the fuel spray easily expands to outward in the radial direction. The number of fuel injections in the first injection mode and the number of fuel injections having the large lift amount may be set as appropriate. Due to such combinations of injections, the shape of the air-fuel mixture layer will expand outward in the radial direction. Moreover, as an alternative, for example, the first injection mode may be combined the fuel injection having the large injection interval to the first injection mode (the lift amount is the same as the first injection mode). In this way also, the negative pressure area becomes small by injecting the fuel with the relatively large injection interval, so that the fuel spray easily expands outward in the radial direction. The number of fuel injections in the first injection mode and the number of fuel injections with the large lift amount may be set as appropriate. Due to such combinations of injections, the shape of the air-fuel mixture layer will expand outward in the radial direction. Moreover, the first injection mode may be a combination of both the fuel injection with the large lift amount as compared to the first injection mode (the fuel injection interval being the same as the first injection mode) and the fuel injection with the large injection interval (the lift amount being the same as the first injection mode). The number of times of these injections may be respectively set as appropriate.

Moreover, the third injection mode may be omitted, and the first injection mode and the second injection mode may be directly switched between according to the level of high or low load of the engine (or according to the level of large or small of the fuel injection amount).

As mentioned above, the shape of the air-fuel mixture layer inside the combustion chamber 17 can be changed by changing the lift amount of the injector 33 and the fuel injection interval; however, in addition to this, the changing range of the shape of the air-fuel mixture layer that is achieved by changing the lift amount of the injector 33 and the fuel injection interval is further increased by increasing the fuel pressure. That is, when the lift amount of the injector 33 is large by increasing the fuel pressure, the kinetic energy of the fuel spray becomes larger, and when the fuel injection interval is small, the degree of the negative pressure becomes high and the negative pressure area is increased. As a result, the changing range of the shape of the air-fuel mixture layer is further increased.

Moreover, although the heat insulation structure of the combustion chamber 17 and the intake port 18 is adopted and the heat insulation layer by the gas layer is formed in the cylinder (inside the combustion chamber 17) in the above example, the presently disclosed technology can be applied to an engine that does not adopt the heat insulation structure of the combustion chamber 17 and the intake port 18.

In addition, since the presently disclosed fuel injection technology is not limited to a purpose of forming the air-fuel mixture layer inside the combustion chamber 17 and the gas layer at the periphery and enables restrain spatially the air fuel ratio distribution inside the combustion chamber 17, it is possible to use for various purposes other than decreasing the cooling loss. Therefore, the structure of the engine 1 is not limited to the above mentioned structures and can be adopt to various engines.

It should be understood that the embodiments herein are illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

EXPLANATION OF LETTERS AND NUMERALS

1 Direct injection gasoline engine (Engine body)
11 Cylinder (Cylinder)
15 Piston
15a Cavity (Concavity)
17 Combustion chamber
33 Injector
41 nozzle opening (Injection opening)
100 Engine control device (Fuel injection control part)

The invention claimed is:
1. A control device for a direct injection gasoline engine comprising:
  an engine body having a cylinder; and
  an injector for injecting fuel including at least gasoline into the cylinder and being configured so that the larger a lift amount of the injector is, the larger a fuel injection opening area of the injector becomes; the control device comprising:
  a fuel injection control part executed on a microprocessor and configured to control the injector to inject fuel multiple times from a compression stroke to an expansion stroke to set an injection interval and lift amount of the injector, wherein the fuel injection control part determines if an engine load is at or above a predetermined first engine load threshold or lower than a predetermined second engine load threshold that is higher than the first engine load threshold;
  wherein when the engine load is lower than the predetermined first engine load threshold, the fuel injection control part controls the injector to inject fuel in a first injection mode at a predetermined narrow injection interval and a predetermined low lift amount; and
  wherein when the engine load is at or above the predetermined second engine load threshold, the fuel injec- tion control part controls the injector to inject fuel in a second injection mode at a predetermined wide injection interval, which is wider than the narrow injection interval of the first injection mode, at a predetermined high lift amount, which is higher than the low lift amount.

2. The control device for direct injection gasoline engines according to claim 1, wherein when the engine load is at or above the predetermined first engine load threshold and below the predetermined second engine load threshold, the fuel injection control part further controls the injector to inject fuel in a third injection mode.

3. The control device for direct injection gasoline engines according to claim 2, wherein the fuel injection control part controls the injector to inject fuel in the first injection mode when an injected fuel amount is not more than a first predetermined quantity, controls the injector to inject fuel in the second injection mode when the injected fuel amount exceeds a second predetermined quantity that is greater than the first predetermined quantity, and controls the injector to inject fuel in the third injection mode when the injected fuel amount is greater than the first predetermined quantity and also is not greater than the second predetermined quantity.

4. The control device for direct injection gasoline engines according to claim 3, wherein the injector is an outward opening valve type, which injects the fuel as a spray in a hollow cone shape, and is located on a central axis of the cylinder on a ceiling surface of a combustion chamber, and a concavity is formed on a crown surface of a piston opposed to the injector.

5. The control device for direct injection gasoline engines according to claim 3, wherein a geometrical compression ratio of the engine body is more than 15.

6. The control device for direct injection gasoline engines according to claim 1, wherein when the engine load is at or above the predetermined first engine load threshold and below the predetermined second engine load threshold, the fuel injection control part controls the injector to inject fuel multiple times in a third injection mode, to set an injection interval that is wider than that of the fuel injections of the first injection mode.

7. The control device for direct injection gasoline engines according to claim 6, wherein the fuel injection control part controls the injector to inject fuel in the first injection mode when an injected fuel amount is not greater than a first predetermined quantity, controls the injector to inject fuel in the second injection mode when the injected fuel amount exceeds a second predetermined quantity that is greater than the first predetermined quantity, and controls the injector to inject fuel in the third injection mode when the injected fuel amount is greater than the first predetermined quantity and also is not greater than the second predetermined quantity.

8. The control device for direct injection gasoline engines according to claim 1, wherein when the engine load is at or above the predetermined first engine load threshold and below the predetermined second engine load threshold, the fuel injection control part controls the injector to inject fuel multiple times in a third injection mode, to set a larger lift amount and a wider injection interval than those of the fuel injections of the first injection mode.

9. The control device for direct injection gasoline engines according to claim 8, wherein the fuel injection control part controls the injector to inject fuel in the first injection mode when an injected fuel amount is not greater than a first predetermined quantity, controls the injector to inject fuel in the second injection mode when the injected fuel amount exceeds a second predetermined quantity that is greater than the first predetermined quantity, and controls the injector to inject fuel in the third injection mode when the injected fuel amount is greater than the first predetermined quantity and also is not greater than the second predetermined quantity.

10. The control device for direct injection gasoline engines according to claim 9, wherein the injector is an outward opening valve type, which injects the fuel as a spray in a hollow cone shape, and is located on a central axis of the cylinder on a ceiling surface of a combustion chamber, and a concavity is formed on a crown surface of a piston opposed to the injector.

11. The control device for direct injection gasoline engines according to claim 9, wherein a geometrical compression ratio of the engine body is more than 15.

12. The control device for direct injection gasoline engines according to claim 1, wherein the fuel injection control part controls the injector to inject fuel into the cylinder during a period from a later stage of a compression stroke to an early stage of an expansion stroke, so that an air-fuel mixture layer is formed in a central part inside a combustion chamber and a heat insulation gas layer is formed at a periphery of the air-fuel mixture layer, and wherein the fuel injection control part controls the injector to inject fuel in the second injection mode when an injected fuel amount exceeds a second predetermined quantity that is greater than a first predetermined quantity, and the fuel injection control part controls the injector to inject fuel in the first injection mode when the injected fuel amount is not greater than the first predetermined quantity.

13. The control device for direct injection gasoline engines according to claim 12, wherein a geometrical compression ratio of the engine body is more than 15.

14. The control device for direct injection gasoline engines according to claim 12, wherein the injector is an outward opening valve type, which injects the fuel as a spray in a hollow cone shape, and is located on a central axis of the cylinder on a ceiling surface of a combustion chamber, and a concavity is formed on a crown surface of a piston opposed to the injector.

15. The control device for direct injection gasoline engines according to claim 14, wherein a geometrical compression ratio of the engine body is more than 15.

16. The control device for direct injection gasoline engines according to claim 12, wherein the fuel injection control part forms the air-fuel mixture layer and the heat insulation gas layer inside the combustion chamber when the engine load is in a predetermined low load range or a predetermined middle load range;
wherein the fuel injection control part determines if the engine load is in the predetermined low load range or the predetermined middle load range; and
wherein the fuel injection control part controls the injector to inject fuel in the first injection mode when the engine load is in the predetermined low load range, and controls the injector to inject fuel in the second injection mode when the engine load is in the predetermined middle load range.

17. The control device for direct injection gasoline engines according to claim 16, wherein a geometrical compression ratio of the engine body is more than 15.

18. The control device for direct injection gasoline engines according to claim 1, wherein the fuel injection control part is configured to control the injector to consecutively inject fuel multiple times.

19. The control device for direct injection gasoline engines according to claim 1, wherein the fuel injection control part controls the injector to inject fuel into the cylinder, so that an air-fuel mixture layer in a trapezoidal shape is formed in a central part inside a combustion chamber.

* * * * *